William W. Odell
Inventor

Patented Apr. 23, 1946

2,398,954

UNITED STATES PATENT OFFICE 2,398,954

PROCESS AND APPARATUS FOR PROMOTING THERMAL REACTIONS

William W. Odell, El Dorado, Ark., assignor to Lion Oil Company, a corporation of Delaware Application February 23, 1943, Serial No. 476,877

18 Claims. (Cl. 196—52)

This invention relates to a process and apparatus for promoting thermal reactions in the vapor phase at elevated temperatures. In particular it is concerned with means and processes of converting hydrocarbon compounds of relatively high molecular weight into compounds of lower molecular weight, but it relates also to reactions which involve complete decomposition or oxidation of the reactant material. The reactions promoted using this invention are commonly catalytic reactions, that is, the reactions are hastened to completion by the use of catalytic materials.

The objects of my invention are rather numerous and include the following: To provide means for conducting chemical reactions at high temperatures in confined chambers which are readily heated without danger of overheating; to provide ready means of heating aeriform fluids prior to their entry into contact with catalytic contact material without exposing metal equipment to excessive temperatures; to reduce the abrasion effect of catalysts or other contact solids moving through hot zones of reaction chambers; to provide a loosely packed mass of solids in the high-temperature or heating zone of a reaction chamber; to provide simple and effective means of control of the temperature of a bed of heated solids during the promotion of reactions therein, making possible the production in maximum yields of such products as butadiene, methyl butadiene, acetylene, other unsaturated hydrocarbons and aromatic compounds; and to economize heat in promoting thermal reactions; other objects will become apparent from the disclosures made herein.

In processes in common use for promoting thermal reactions the operation is intermittent when high temperatures are employed. One means of making the process substantially continuous, particularly when promoting reactions which are endothermic in nature, is to employ a moving catalyst with counter flow of reactant fluid; this procedure presents many problems which have hindered more general use of such a process, such as abrasion, overheating of portions of the mass of solids, or overheating of the metal parts adjacent thereto. I find that it is possible, heating a downwardly moving bed of substantially uniformly sized solids to temperatures favorable for promoting thermal reactions, to continuously maintain a hot zone in said bed without endangering the oxidation of metal parts of the equipment employed, simultaneously with the promotion of thermal reactions in another portion within the confines of the same downwardly moving bed of solids. Means for accomplishing this are shown in the figures.

The same system of numbering is used throughout the figures. However the lower baffle flaring member 39—A of Figure 2 accomplishes the same purpose as flaring member 12 of Figure 1. Holes in member 39—A are designated 40—A. Means for quickly quenching the stream of reaction products discharged from 1, through 11 in Figure 2, is shown by water line 56 and control valve 57 whereby water or other volatile coolant is introduced in said stream partly cooling it only, while all of the coolant vaporizes; additional cooling is accomplished by introducing a less volatile coolant through valve 58 and bustle pipe 59. The same cooling connections are used with the apparatus of Figure 1 but are not shown for simplicity.

Figure 1:
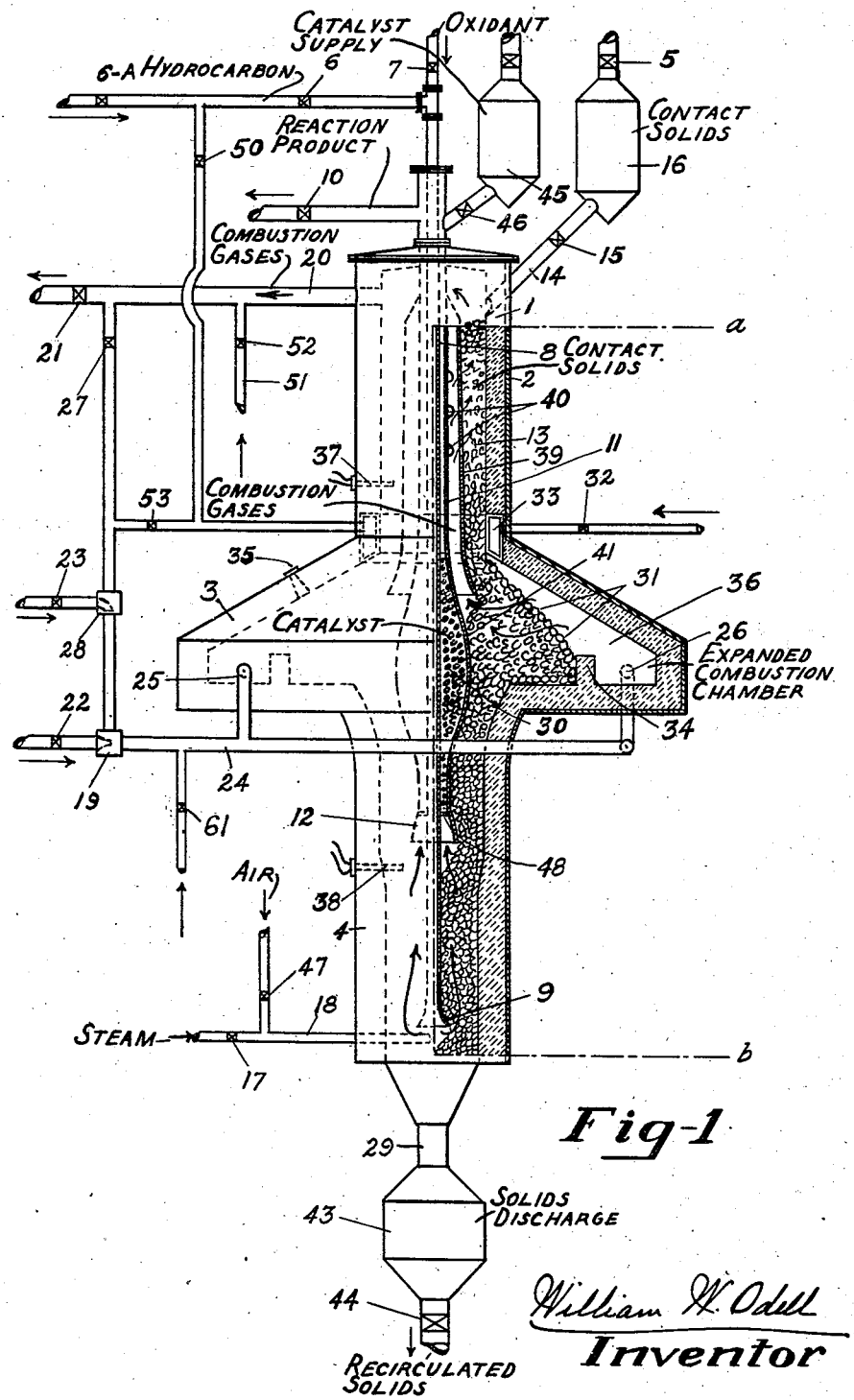
Figure 1 shows diagrammatically in elevation one form of apparatus in which my invention may be practiced; a portion of the apparatus indicated by the dot and dash line ab is shown in section, for the purpose of clearness, through the middle.
Figure 2:
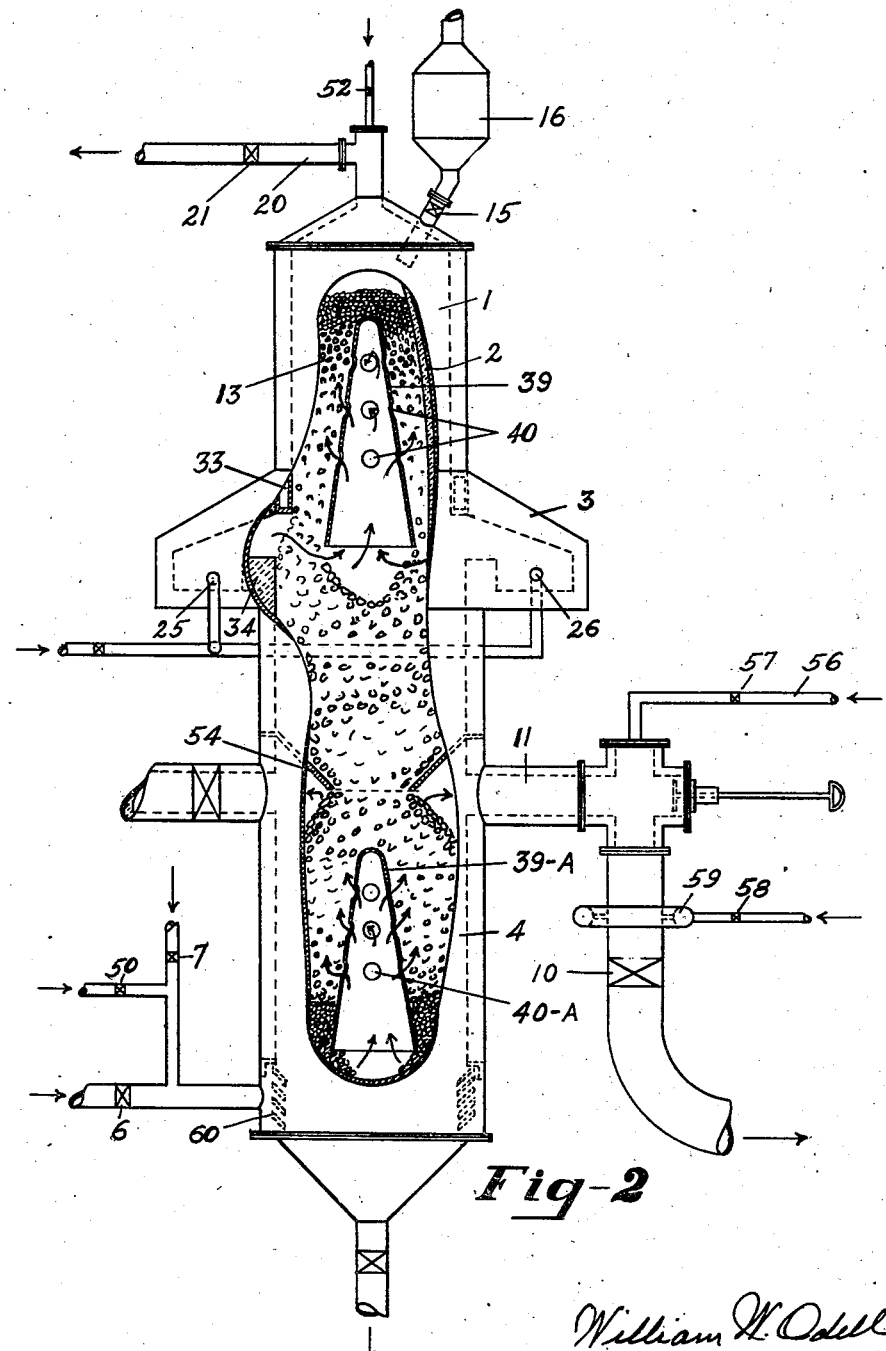
Figure 2 shows in elevation, diagrammatically, another form of apparatus in which my invention may be practiced; a portion of the front is cut away to show the interior in section.

In Figure 1 the upper portion of the apparatus 1 hereinafter referred to as a furnace, having jacket casing 2, is continuously connected with the lower portion 4 and middle portion 3, which portions collectively confine the major portion of the sized solids which form the bed 13 and which have a surface 31 adapted to receive burning gases and/or hot products of combustion. Valve 6 controls a supply of reactant hydrocarbon and valve 7 controls the supply of steam and/or other oxidant, to the tube 8 which extends downwardly through the bottom portion of the furnace ending in a flared portion 9. Valve 10 controls the flow of outlet fluids from tube 11, which tube also extends to the lower portion of the bed of solids 13 and has flaring portions 12 and 41. Means for charging the sized solids into the upper portion of the furnace are shown by reservoir 16, valve 15 and conduit 14. Valve 17 controls the supply of oxidant, usually steam, to line 18 which discharges in the lower portion of the mass of sized solids. The sized solids supplied through valve 15 are discharged through 29, reservoir 43, and valve 44. Products of combustion are discharged through conduit 20 and valve 21, whereas valve 22 controls the supply of combustible gas-air mixture flowing through conduit 24 and inlet ports 25 and 26 into combustion chamber 36. Valve 27 controls the amount of recirculation of products of combustion from conduit 20 back into the combustion chamber 36. Valve 23 controls the auxiliary supply of air which passes through mixing chambers 28 and 19 and passes with the gas-air stream through conduit 24. A mass of chosen, small-size, contact material, usually a catalyst, is shown at 30 in the space between the two tubes 8 and 11. Valve 32 controls the supply of cooling fluid to the annular chamber 33 which chamber is normally used for preheating the reactant material or the combustible gas used in the process. An annular portion 34 is provided substantially in the combustion chamber 36 which chamber also has inspection peep-holes such as indicated by 35; thermocouple connections are shown at 37 and 38. An inner shield and outwardly flaring member 39 in the upper portion of furnace 1 has perforations 40 for allowing combustion products to pass therethrough. The catalyst mass shown at 30 is preferably comprised of uniformly sized solids and preferably substantially spherical in shape. The contact solids of bed 13 entering 1 through valves 5 and 15 are also preferably uniformly sized and preferably of substantially spherical shape. An expanded portion of tube or catalyst chamber 11 is shown at 41, the catalyst charging reservoir at 45 with control valve 46 and catalyst supporting grate 48. A control valve for an auxiliary supply of air is shown at 47; bypass valve 53 provides means for using preheated gas as fuel gas. Steam conduit 51 with control valve 52 provide means for supplying steam periodically to bed 13. Valve 50 provides means for supplying preheated hydrocarbon vapor or gas to pipe 8 when valve 6 is open. Valve 61 is for steam.

In Figure 2 the reaction products are conducted away from the furnace at a midway portion thereof through an offtake numbered 11 which corresponds with the vertical conduit 11 of Figure 1. With furnaces of large diameter it is definitely preferable to have a plurality of suitable offtake ports for the reaction products in order to prevent channeling of the flow of fluids thereto through bed 13. Only one such outlet is shown here for the purpose of simplicity.

Referring to Figure 1 and considering the thermal reactions of hydrocarbons in the vapor phase, the operating procedure is as follows:

*Example 1.*—Thermal reaction of naphtha vapors by virtue of contact with catalytic solids at a temperature approximating 1100° to 1470° F.

The furnace is filled with sized solids through the charging hopper 16 and valve 15 until the upper portion is substantially full. Catalyst 30 is charged into pipe 11 from catalyst reservoir 45 through valve 46 until it is substantially full, after which valve 46 is closed. Combustible gas and air are admitted through valve 22, mixing chamber 19, conduit 24, and inlet ports 25 and 26 to chamber 36, in which combustion is promoted, the products of combustion passing through the exposed surface 31 of the free flowing portion of the bed of solids 13. The said products of combustion pass upwardly through said bed 13 largely by a path indicated by the arrows whereby they contact the outer surface of reaction tube 11 and pass through the openings such as those shown at 40 in the baffle member 39, finally through an upper portion of the bed 13 and out through offtake 20 and valve 21, which valve is open. After the wall of chamber 36 and the portion of the exposed bed of solids is sufficiently heated, that is, heated to a temperature approximating 1300° to 1400° F., the solids comprising the bed 13 are allowed to slowly move downwardly by withdrawing them through discharge reservoir 43 by opening valve 44, meanwhile continuing the burning of gases in said chamber 36. As the solids pass downwardly the portion of bed 13 in the lower section 4 of the furnace will be at a temperature approximating 1300° to 1350° F. When this stage is reached, the naphtha vapors are admitted to the tube 8 by opening valve 6. Preferably some steam is also simultaneously admitted to tube 8 by opening valve 7. Vapors passing downwardly through pipe 8 enter the bed of hot solids 13 through the flaring portion 9 pass upwardly through said heated bed as indicated by the arrows to the flaring portion 12 of the catalyst reaction tube 11. The vapors pass upwardly through the bed of catalyst 30 wherein thermal reactions are completed and the reaction products are discharged through valve 10 from which they are cooled and led to suitable equipment for the recovery of the valuable by-products. These operations are continuous and the cycle is complete except that the solids in bed 13 must be supplied through reservoir 16 and valve 15 at a rate comparable to that of the withdrawal of said solids through valve 44. It will be noted that the temperature of the catalyst bed in reaction tube 11 is lower than the temperature of the solids in the hot zone of bed 13. The optimum temperature to be maintained in the catalyst bed is not the same for all grades of naphtha and similarly the optimum temperature of the solids in the portion of bed 13 through which the vapors pass before entering the flared portion 12 of reaction tube 11 is not the same for all naphthas. Accordingly it is desirable to determine this optimum temperature by experiment. For the production of butadiene and employing a naphtha having a boiling range of about 190° to 390° F. I find that a satisfactory temperature of the solids in the bed 13 at a location substantially as indicated by the thermocouple 38 is approximately 1300° to 1400° F. The solids of which bed 13 is comprised may be composed of silica, clay, alumina, or other refractory silicates or oxides. The catalyst in this example is preferably chromium oxide but may be a siliceous composition containing chromium oxide and/or reduced copper, or it may be comprised of other materials known to catalyze thermal reactions without the formation of carbon. The rate of flow of the naphtha vapors through valve 6, pipe 8, and through the hot solids of bed 13 is controlled in accordance with the temperature of said bed as indicated by the thermocouple 38. For example the time of contact of the vapors with the hot solids of bed 13 should normally be of the order to one-tenth of one second when the temperature of the solids in the portion of bed 13 through which they pass approximates 1300° to 1350° F. Accordingly the rate of discharge of the solids through valve 44 is controlled so that the desired temperature is maintained in the hot zones of bed 13. After operation is well under way attention is given to the control of three major factors, namely the rate at which combustible material is burned in the combustion chamber 36, the rate of introduction of naphtha vapors through valve 6 into tube 8, and the amount of steam introduced through valve 17 and conduit 18, as well as the rate of movement downwardly of the solids of bed 13. Within certain limits the capacity of a given size unit is a function of the rate at which combustible matter admitted through valve 22 is burned in combustion chamber 36; hence in commercial operation it is desirable to burn combustible matter in said chamber 36 at a rather high rate. When burning fuel at a high rate in chamber 36, I find it highly advantageous, in avoiding overheating a portion of the solids and the combustion chamber wall, to inject a portion of the waste gases along with the combustible gas admitted to chamber 36, by opening valves 27 and 23. This dilution of the burning gases causes the formation of a thicker hot zone adjacent the surface 31 of the solids exposed to the burning gases. I find that the use of some steam through valve 17 and conduit 18 is helpful in reducing the amount of hydrogen formed by thermal reactions and in eliminating the formation of carbon, particularly when the temperature of the solids in bed 13 between flaring members 9 and 12 is high, namely above 1300° F. It will be noted that the pressure which obtains through the bed 13 must be controlled in order to avoid the mixing of reactant fluids with the fuel gas or products of combustion. It is commonly preferable to so regulate valve 21, in the discharge line for the products of combustion, that a small amount of the products of combustion are forced downwardly and mingle with the reactant fluid stream which passes upwardly through the catalyst bed 30. However, under certain conditions it is essential that the products of combustion be kept out of the catalyst bed in which instance the pressure in the lower portion of the unit is kept sufficiently high by supplying fluids at a high enough rate through valves 6 and 17 so that a small portion of the reactant fluids pass upwardly outside of the flaring member 12 and mingle with the burning gases, passing out with the products of combustion; in this case valve 21 is not usually throttled. A similar effect can be obtained with lower rates of flow of the reactant materials by throttling valve 10 in the discharge offtake from reaction tube 11. The metal annular member 33 tends to get unduly hot under certain conditions of operation and I find that it can be kept at a safe working temperature by circulating therethrough naphtha vapors thus preheating them before admitting them through valve 6 into the tube 8. The preheating of the naphtha vapors increases the capacity of a given size unit. The products which may be obtained by the thermal reaction of naphtha vapors are numerous and operating conditions in the treatment of such vapors must be adjusted in accordance with the results sought. For example, in the production of maximum amounts of butadiene the time of contact of the vapors with heated solids must be extremely brief, whereas in the production of unsaturated hydrocarbons of lower molecular weight and/or aromatic hydrocarbons a longer time of contact with heated solids may be employed. In the production of ethylene, propylene, and butylene I find that it is advantageous to employ a somewhat longer time of contact of the naphtha vapors with the heated solids in bed 13 than one-tenth of a second at a temperature preferably lower than 1380° F., namely about 1100° to 1380° F. When aromatic hydrocarbons are of particular interest they can be produced most satisfactorily at temperatures higher than 1200° F. with a time of contact varying upwardly from one-tenth of a second.

The solids discharged from the unit through valve 44 are recirculated and introduced at the top thereof through valve 5, reservoir 16 and valve 15; means for accomplishing this are not shown in Figure 1 for the purpose of simplicity. A closed, gas-tight conveyor system can readily be connected with the inlet and outlet reservoirs whereby the discharged solids can be automatically elevated and charged into hopper 16. When this is done, the use of steam through valve 17 serves an additional useful purpose, namely it prevents the passage of naphtha vapors out with the solids discharged through valve 44. It is understood that the catalyst 30 employed in reaction tube 11 of Figure 1 is selected in accordance with the nature and type of reactions to be promoted therein. In promoting reactions of the type thus far discussed I find it is advantageous to use copper tubing or tubing comprising copper for reaction tubes 8 and 11; this is also true in the production of acetylene from naphtha. It is believed that the disclosure of operations made above is sufficient so that one skilled in the art can so adjust operating variables as to obtain optimum results in thermal operations employing naphtha vapors as the major reactant in the apparatus shown in Figure 1. Conditions vary as the size of the unit shown in Figure 1 varies, hence it is necessary to adjust the variables in ascertaining optimum conditions for a given size unit. As the size of the unit increases, the size of the solids comprising bed 13 can also be increased. With a given amount of combustion products and burning gases flowing into bed 13 through surface 31 and with a given rate of flow downwardly of the solids of said bed 13 the thickness of the hot zone adjacent surface 31 increases as the size of the solids therein are increased. Thus with very small sized solids in bed 13 the surface 31 is intensely heated and the thickness of the hot zone is not great; with larger sized pieces the thickness of the hot zone is greater and the temperature of the pieces of solids in said zone is lower. This factor must be considered in selecting the solids for a particular size unit.

Again referring to Figure 1, it will be noted that the downwardly moving contact solids 13 reach their peak temperature in the bed adjacent combustion zone 36, and that the hydrocarbon entering the mass of hot solids at the bottom of pipe 8 react by endothermic reactions absorbing heat, thus the stream of fluid containing the initially formed reaction products and the unreacted reactant tends to have progressively a lower temperature as it passes from flaring member 9 to flaring member 12 and to the catalyst bed. Offsetting this effect is the downward movement of the hot contact solids. It will readily be seen that the duration of the period of time when the reactant stream is at a high temperature is not only a function of the flow of fluid reactant into the mass of hot solids but it is also a function of the rate of the downward movement of the solids. It is possible to provide a high mean temperature above 1350° F. in the hot zone of the contact solids but so control their movements that the stream of reactant fluids attains their approximate temperature for a period of time of 0.01 second or less to 0.10 second or more. Because, in promoting many reactions, very little heat is absorbed as heat of reaction in the catalyst reaction chamber it is usually not difficult to maintain the catalyst bed at a satisfactory temperature; the sensible heat of the fluids from 9 entering the bed through 12 contributes appreciably to this end, but an additional amount of heat is supplied by contact of the gaseous products of combustion from furnace chamber 36 with the outer surface of the catalyst chamber. When an additional amount of heat is required one can resort to other means than increasing the supply of heat energy to furnace 36, that is, other than burning more gas therein, and to other means than slowing the rate of feed of reactants to pipe 8; some of the products of combustion can be forced into the catalyst bed through 12 during operation of the process by throttling valve 21. Still referring to Figure 1 and to the production of unsaturated and aromatic hydrocarbons from naphtha, following the procedure outlined above, it will be noted that the stream of reaction products passing upwardly through the catalyst bed and out of pipe 11 through valve 10 do not leave the said pipe 11 at the high temperature to which reference has been made; rather they leave at a lower temperature by virtue of the cooling action of the stream of reaction products entering the system through valve 6 and pipe 8 and by virtue of the cooling action of the contact mass in the upper portion of contact material 13, which material contacts the outer surface of pipe 11. The hydrocarbon introduced into the system through valve 6 and tube 8 is preheated in its passage downwardly before it enters the bed of contact material adjacent flaring member 9. Even when the reactant hydrocarbon is preheated prior to introduction into tube 8 such as by circulating said reactant through annular chamber 33 and passing it through valve 50 and 6, the temperature of the outgoing reaction products passing through valve 10 is sufficiently low so that further reaction or cracking does not occur to any appreciable extent. The reaction products passing in the fluid stream from pipe 11 through valve 10 are conducted to known means for cooling, condensing and recovery of the valuable components thereof. Although this invention is not concerned with particular scrubbers, absorbers, or means of separating these various products attention is called here to a particular procedure which makes possible the operation of the invention with the economic use of raw materials and the obtaining of unique results. In normal operation recovering valuable products of reaction of the type produced here it is common practice to cool and condense from the stream of reaction products any condensible matter, to compress and again cool, condensing condensible matter, employing bubble tower fractionators or solid absorbents as a means for isolating various fractions from said stream. In the course of this said procedure it is also common practice to separate as one group gases comprising nitrogen, hydrogen, carbon monoxide, carbon dioxide, and much of the methane formed as a product of reaction and separate as another group gaseous hydrocarbons which have a higher mean molecular weight than the molecular weight of methane; this result is obtained because of the difference in solubility of the various gases under pressure in the absorbents or wash oils commonly used. It is one of the objects of this invention to effectively utilize in the process hydrocarbons singularly or in mixtures having a greater mean molecular weight than that of methane. To be specific, the hydrocarbon reaction products removed through valve 10 are subjected to fractionation by known means whereby there is obtained a plurality of fractions, one comprising fixed gases, a second comprising hydrocarbons of relatively low molecular weight such as ethylene, propylene, ethane and propane, and a third fraction containing products of higher molecular weight. The fraction containing propylene and/or ethylene can be effectively recirculated in the process, being admitted thereto through valve 6. One reaction which is notably applicable to this invention is that shown in Equation 1 whereby butadiene is produced from propylene, which propylene may be a product of reaction which is recovered and recirculated or it may be from an entirely separate source.

(1) 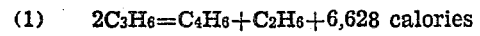 $2C_3H_6 = C_4H_6 + C_2H_6 + 6,628$ calories

This reaction is not endothermic but on the contrary is exothermic, hence if all of the propylene introduced reacted in this manner and there were no other reactions occurring simultaneously it would be necessary to apply refrigeration instead of combustion in what is shown to be the hot zone. It is found that all of the propylene does not react in this manner although the temperature found to be favorable for the reaction to occur, 1300° to 1550° F., can very readily be maintained in the catalyst mass 30. Another example of the use of lighter hydrocarbons in this process is the production of olefin hydrocarbons from butane as typified by Equation 2.

(2)  $2C_4H_{10} + \text{heat} = C_2H_4 + 2C_3H_6 + H_2 - 12,754$ calories The light gases, including hydrogen and methane, along with any carbon monoxide, carbon dioxide and nitrogen which are formed in the process and which are readily separated as a group from the other components of the stream containing reaction products, can be utilized in this process as fuel gas which is supplied through inlet ports 25 and 26 into combustion chamber 36 of Figure 1. When this is done I find that the nitrogen content of the recirculated gas used as fuel increases as the amount of products of combustion produced in the process and withdrawn through the catalyst is increased; this increase of the nitrogen content of the fuel gas reaches a definite equilibrium limit after a period of operation. It is noteworthy that the nitrogen dilution is advantageous in this case because it makes possible the use in the combustion chamber of a larger volume of fuel gas per unit amount of heat generated in the process thereby producing lower flame temperatures in the furnace. A study of Figure 1 will show that in promoting certain types of reactions, namely those that are not extremely endothermic in nature, the rate of movement downwardly of the solids of which bed 13 is comprised need not be very rapid, in fact, it might be very low. Employing an appreciable amount of combustion reactions in combustion chamber 36 and preheating the stream of reactant material supplied through valve 6, many reactions can be promoted with a very slow rate of downward movement of the contact solids of bed 13. A state of equilibrium can be reached promoting some reactions whereby said solids need not move downwardly at all. The latter statement is particularly true when the heat of reaction of the total reactions occurring in the process is not strongly endothermic or when an appreciable amount of the products of combustion of the fuel gas supplied to combustion chamber 36 of Figure 1 are caused to pass into the stream of reactants as through the opening shown at flaring member 12.

Under the latter conditions when combustion products are utilized in the process it is sometimes advantageous to use dilution or burn a fuel gas containing appreciable amounts of nitrogen in order to avoid excessive temperatures in the mass of solids adjacent the exposed surface 31; it is also frequently advantageous to employ a fuel gas containing hydrogen because of the production of steam by the combustion thereof. In the treatment of fluids by counter current contact with a downwardly moving, confined mass of solids one of the problems inherent in the process is that of combating erosion; by reducing the rate of travel of the contact solids downwardly the erosion effect on the walls of the confining equipment is reduced to a minimum; the solution of the problem is of importance and is one of the novel features of this invention. It is found that when one operates this invention in the manner just described with extremely low rates of flow downwardly of the solids of bed 13 there may be, with certain types of reactions, a tendency for the solids in the upper portion of bed 13 to become heated to a temperature incompatible with desired thermal efficiency; this can be obviated without discontinuing the flow of reactant fluids into the process by occasionally discontinuing the supply of fuel to the combustion chamber 36, closing offtake valve 21, opening steam valve 52 in steam line 51 and causing the flow of steam to pass for a brief period downwardly through bed of solids 13 becoming heated to reaction temperatures in the hot zone of said bed 13 and to pass with the reactant stream upwardly beneath flaring member 12 into the catalyst bed. Although this is a periodic feature the operation of the process is continuous.

Thus far consideration has been given largely to types of reactions which might be classed as cracking and which include the treatment at elevated temperatures of hydrocarbons that are normally either gaseous, liquid or solid at standard conditions of temperature and pressure, but other types of reactions can equally well be promoted in the apparatus such as that shown in Figure 1 or other types of apparatus which come within the confines of this invention. One such type of reactions includes oxidation accompanied by evolution of heat. Referring to Figure 1, when a reaction of this type is promoted simultaneously with the cracking or endothermic type of reaction the supply of the different reactants can be so adjusted that the downward movement of the solids of bed 13 need only be that found to be desirable to eliminate deposited matter, thus keeping the bed clean and eliminating any flues or channels which would be permanent if once formed and the bed was stationary. Oxidation reactions include the production from hydrocarbons of aldehydes, acids, phenolic compounds and hydroxy compounds of which alcohols are one class. It is possible, for example, to incompletely burn a hydrocarbon by properly controlling the mixture of it with an oxidizing fluid such as air, with the formation of considerable aldehyde and/or alcoholic compounds. These reactions can be promoted by introducing the reactant hydrocarbon as the fuel admitted to combustion chamber 36 through valve 22 and ports 25 and 26, the heat of reaction being utilized to keep the catalyst chamber hot at 41. When it is desirable to keep the reaction products separate from those made within pipe 11 they are removed as outlined above, through offtake 20 and valve 21 whereas under other conditions they are largely or entirely removed with other reaction products through 12 and outlet valve 10; said other reactions may comprise hydrocarbon re-forming or cracking promoted by admitting the reactant hydrocarbon or hydrocarbons through valve 6, pipe 8 and flaring member 9 as described. Although this invention deals with hydrocarbons as raw materials other substances which react with hydrocarbons must also be considered reactants within the meaning used herein, for example, oxygen, ammonia and other materials that withstand brief heating to elevated temperatures and which react chemically at elevated temperatures with hydrocarbons or their oxidation products yielding valuable end products. Various amino compounds are produceable in a single apparatus in this manner. Thus if a vapor of a petroleum hydrocarbon or a natural gasoline is introduced into combustion chamber 36 simultaneously as air with preferably some steam is admitted thereto and incomplete combustion promoted in the stream, there is formed, when conditions are adjusted properly so that the temperature in the solids adjacent surface 31 is not too high, unsaturated hydrocarbons including ethylene and propylene besides hydrogen, methane and products of complete combustion; some of these products of reaction combine or react with ammonia forming valuable reaction products. The ammonia can most readily be introduced into the system through valve 6 and pipe 8 as outlined, the reaction products being discharged through 11 and valve 10. In this case very little, if any, of the products of reactions are removed through offtake 20 and the solids comprising bed 13 may be oxidation catalysts whereas bed 30 may be an entirely different type of catalyst. Without unnecessary elaboration as to particular reactions which can be promoted in this process, it seems sufficient to record that two different types of reactions, exothermic and endothermic reactions, can be simultaneously promoted in a single apparatus wherein the heat of reaction of the former is utilized in the latter, and that the exothermic reaction products can at will be withdrawn from their zone of production with, or separate from, the products of endothermic reaction. This is one of the features which I believe to be new. It is, of course understood that the proper temperatures are maintained in the reaction zones of the beds of solids 13 and 30 optimum for promoting the various reactions; those employing ammonia must be conducted at lower temperatures than the cracking reactions such as those yielding butadiene and styrene.

Referring to Figure 2 the operation is substantially the same as described above except that the reactant hydrocarbon admitted through valve 6 passes into the bottom of the reaction chamber through grate 60; valve 7 controls the supply of steam or other oxidant and valve 50 controls a supply of preheated reactant. No enclosed catalyst chamber is shown in Figure 2.

In promoting cracking reactions in which hydrocarbons of relatively high molecular weight are caused to yield hydrocarbons of relatively low molecular weight and employing high temperatures of the order of 1300° to 1600° F. there is a tendency for carbon to form as a product of reaction; this carbon adheres to the solids in the lower portion of bed 13 and is removed as said solids are removed. No special treatment of the removed solids is normally required because when they are recirculated back into the system through valves 5 and 15 the carbon can be burned off in the combustion zone by controlling the amount of air introduced into the furnace combustion chamber 36. One means of reducing the amount of carbon formation to a minimum is shown by pipe 18 for oxidant and valve 17 by which steam may be admitted into the reactant fluid stream. The velocity of stream flow of reactant fluids through the lower portion of bed 13 between 9 and 12 is usually lower than through catalyst bed 30, hence, other factors remaining the same, the tendency for carbon to deposit is greater in bed 13. However, additional means of controlling this factor are at hand. Excess air can be employed periodically in firing fuel to chamber 36 or air and steam alone can be periodically introduced therein without fuel gas, passing them downwardly through the hot bed of solids, and up under 12 and through the catalyst bed; or air and steam can be admitted through pipe 18 periodically for brief periods. In stubborn cases, when it is desirable to operate under temperature conditions and flow rates whereby detrimental amounts of carbon deposit in the catalyst and when the periodic use of air and/or steam is not practicable or desirable as a cleaning medium, the grid or grate 48 which holds catalyst 30 in place can be removed allowing the catalyst to flow downwardly as the solids 13 similarly move. By employing said solids and catalyst of different size, they can readily be separated from one another by screening. The relative amount of solids 13 and catalyst 30 discharged through reservoir 43 is regulated by proportioning the diameters of the flaring member 12 relative to the adjacent inside diameter of retaining wall at 4. The reaction of Equation 2 can be conducted without carbon troubles and the catalyst may be copper, brass, and other materials but preferably not iron, which metal catalyzes the formation of carbon; that of Equation 1 and associated reactions can be conducted without carbon formation at about 1300° to 1400° F. when the flow velocity is high and time of contact with hot surfaces is very brief, namely a fraction of a second. In general, employing high temperatures in the solids contacted by reactants during processing it is essential that the reactant stream remains at said high temperature for a fraction of a second only when using as the major reactant hydrocarbons having a molecular weight greater than that of butane. Somewhat more time may be used with the hydrocarbons having 1, 2, 3, or 4 carbon atoms per molecule. In the incomplete oxidation of hydrocarbons to aldehydes and/or other products of oxidation the control of reaction temperature is a very important factor in obtaining optimum yields; excessive temperatures destroy formaldehyde, aldehyde and the alcohols. The reactions for their production being exothermic it is essential that steps be taken to burn the hydrocarbons with a limited amount of oxygen, preferably diluted with inerts and in contact with solid surfaces that are at a temperature below that at which rapid decomposition of aldehydes and alcohols occur. A similar effect is obtained when a stream of the mixture of hydrocarbon and combustion supporting gas is passed into a bed of hot solids at so rapid a rate that the reacting fluid is in a relatively cooler zone before reaction is complete and preferably in a zone containing a suitable catalyst. In view of the foregoing it will be apparent that this can readily be accomplished by controlling variables as follows: (a) dilution of the hydrocarbon used as reactant, (b) the rate of travel downwardly of the solids of bed 13, (c) direction of flow of fluids through bed 13, (d) use of steam through conduit 18. High velocity of flow of the stream of gas containing oxygen and hydrocarbon, admitted through ports 25 and 26 through bed 13, upwardly unless steam and/or hydrocarbon fluid is introduced through pipe 18 under which conditions satisfactory results are obtained by causing the burning hydrocarbon to pass down through 13, join the stream from 18 at the flaring member 12 and pass up at increased velocity through bed 30.

It is believed that the novelty of this invention as it relates to apparatus may be further clarified by a brief disclosure of its evolution and development. An attempt was made to carry out thermal hydrocarbon reactions using butane as raw material and city gas as a fuel gas in an apparatus such as that shown in Figure 2 without baffle members 39, 39—A and 54. The result was that the zone occupied by baffle member 39 was a rather cool zone, the hot gases from combustion chamber 36 passed upwardly largely along the wall of the upper portion of furnace 1; the hot products of combustion did not penetrate toward the middle portion of the bed 13 whereas increasing the rate of flow of these products did not help but rather intensified combustion at the annular portion 33 of the wall. Furthermore the zone occupied by baffle member 39—A was a relatively hot zone, the reactant stream passing upwardly along the wall of 4. The installation of 39 and 39—A was most helpful in eliminating these conditions but satisfactory results were not obtained until holes 40 and 40—A were made in these baffles. Similarly baffle 54 caused an improvement in preventing channeling of the gas streams through bed 13 and it prevented particles of solid from choking the discharge tube 11. Because of the need for a large, loosely packed, exposed portion of bed 13 in or at the combustion chamber 36 and the need for a catalyst, the modification shown in Figure 1 was developed which made possible a reasonably sharp control of the amount of mixing of the fluid streams flowing through bed 13, namely the products of combustion and the hydrocarbon fluid supplied through valve 6. In this modification the major portion of the products of combustion or burning gases pass from chamber 36 substantially horizontally into and across the path of travel of the solids of bed 13 through the exposed surface 31. The tubular arrangements also proved to be real improvements. It has been stated that tubes 8 and 11 should preferably be copper or a copper containing alloy but copper or brass coated alloy steels are quite satisfactory; it is most important for many reactions that the outer surface of pipe 8 and the inner surface of 11 be of other material than iron or nickel and preferably copper.

It is understood that the pressure in the stream of reactant fluid during the reaction period, in the application of this invention, may be less than atmospheric or greater than one atmosphere absolute. In general it is preferable to employ low superatmospheric pressures which are the impelling means for causing fluids to flow through the reaction zones.

Having described my invention so that one skilled in the art can practice it, I claim:

1. A process which comprises passing a continuous column of solids downwardly through a reaction zone, introducing heating gases at an expanded intermediate heating zone in said column, passing said heating gases upwardly and out at the upper portion of said column of solids, simultaneously introducing a fluid stream including hydrocarbon vapor at the lower portion of the moving column, passing said fluid stream including the hydrocarbon vapor upwardly through said column wherein the hydrocarbon is at least partly thermally decomposed, withdrawing the stream including the resulting reaction products from the said column at a point below the point of introduction of the heating gases, and maintaining a controlled gas pressure throughout the downwardly moving column of solids.

2. A process as set forth in claim 1 wherein the solids in the upper portion of said column are loosely packed to provide an easy path for travel for the heating gases upwardly from their point of introduction, whereby excessive mixing of said gases with the reaction products derived from the hydrocarbon vapors is avoided.

3. A process as set forth in claim 1 wherein a free tumbling motion of said solids is maintained within the heating zone to insure uniform heating of the particles of said bed.

4. A process as set forth in claim 1 wherein a dense bed of solids is maintained between the intermediate zone and the point of separation of the reaction products in order to minimize the mixing of the reaction products with the heating gases.

5. A process as set forth in claim 1 wherein the heating gases comprise freshly generated products of combustion.

6. A process as set forth in claim 1 wherein the heating gases comprise freshly generated products of combustion admixed with a diluent gas for the purpose of temperature control.

7. A process as set forth in claim 1 wherein the solids adjacent the point of withdrawal of the reaction products are loosely packed to facilitate such withdrawal.

8. A process as set forth in claim 1 wherein the fluid stream containing hydrocarbon vapors is preheated by heat interchange with the column of solids before being introduced into said column.

9. A process as set forth in claim 1 wherein the hydrocarbon vapors in the fluid stream are only partially reacted prior to removal from the downwardly moving column of solids, and are further reacted after withdrawal from the column by contact with hot catalytic material in the intermediate and upper zones of said column.

10. A process as set forth in claim 1 wherein the hydrocarbon vapors admitted to the lower portion of the column are commingled with a predetermined quantity of an oxidant.

11. A process which comprises passing a continuous column of solids downwardly through a reaction zone, heating said column by introducing thereinto at an expanded intermediate zone a hot gas, and passing the gas upwardly through the column and out at the upper portion thereof, preheating a fluid stream containing a hydrocarbon vapor, and introducing said stream into the lower part of the moving column, passing said stream upwardly through said column whereby the hydrocarbon is at least partially thermally decomposed, withdrawing the stream including the reaction products from the column at a point below the point of introduction of said first named hot gas, and passing said stream upwardly through a separate passage extending through the column of solids.

12. A process which comprises passing a continuous column of solids substantially continuously downwardly through a reaction zone, heating the solids by introducing hot gases thereinto at an expanded intermediate point in said column, passing said hot gases upwardly through said column, and withdrawing the same from the upper portion of the column, simultaneously introducing a fluid stream including a hydrocarbon vapor into the lower portion of said column below the point of introduction of said hot gases, passing said stream upwardly through said column whereby said hydrocarbon vapor is thermally decomposed, withdrawing the reaction products from said column at a point below the point of introduction of the hot gases, and continuously maintaining a controlled gas pressure throughout the column, the solids in at least the upper portion of said column being sufficiently loosely packed to allow an easy upward path of travel for the hot gases through the upper zone of said column to avoid admixture of said gases with the reaction products.

13. The process of promoting vapor phase thermal chemical reactions in a flowing stream including a hydrocarbon while passing through an appreciably deep contact bed comprising a continuous column of solids confined in a reaction furnace at elevated temperatures, which process comprises passing said column of solids downwardly into and through a reaction zone, introducing hot gases into an expanded zone located intermediate the ends of the furnace, maintaining the solids in the expanded portion of said bed in a loose and free-tumbling condition, passing the said hot gases through said expanded portion and upwardly through the upper portion of said column and out at the top of said furnace, simultaneously introducing a hydrocarbon fluid in the vapor phase into the lower portion of said moving column located substantially below said expanded portion, passing said hydrocarbon upwardly through the lower portion of said column wherein it is thermally decomposed and separately withdrawing the reaction products from said column at a point below the point of introduction of said first named hot gases, and so correlating the depth of the upper and lower zones of said column with the discharge pressures of the two named gaseous streams that mixing of the first mentioned hot gases with the products of reaction is substantially avoided.

14. An apparatus of the character described, comprising an elongated upright furnace, having an expanded intermediate portion, means for introducing contact solids at the top of said furnace and for withdrawing solids from the bottom of said furnace, means for controlling the rate of supply and withdrawal of said contact solids so that a continuous downwardly moving column is maintained which is relatively loosely packed at the intermediate zone, means for supplying a heating gas to the solids at said intermediate zone and withdrawing the same from the upper portion of said column, whereby the heat is supplied to the downwardly moving solids, means for supplying a fluid stream including a reactant portion to the lower portion of said column whereby the reactant portion is subjected to thermal action to produce reaction products, and means for withdrawing the fluid stream containing said reaction products from said column below the point of admission of the heating gases, and for discharging said fluid stream separately from the heating gases, said withdrawing means including a vertical tube extending through the upper zone of the downwardly moving solids, through which tube the reaction products are passed after being withdrawn from the lower portion of the column of solids.

15. An apparatus of the character described, comprising an elongated upright furnace, having an expanded intermediate portion, means for introducing contact solids at the top of said furnace and for withdrawing said contact solids from the bottom of said furnace, means for controlling the rate of supply and withdrawal of said solids so that a continuous downwardly moving column is maintained which is relatively loosely packed at the intermediate zone, means for supplying a heating gas to the solids at said intermediate zone and withdrawing the same from the upper portion of said column, whereby the heat is supplied to the downwardly moving solids, means for supplying a fluid stream including a reactant portion to the lower portion of said column whereby the reactant portion is subjected to thermal decomposition, and means for withdrawing the fluid stream from said column below the point of admission of the heating gases, and for discharging said fluid stream separately from the heating gases, said withdrawing means including a vertical tube extending through the upper zone of the downwardly moving solids, through which tube the reaction products are passed after being withdrawn from the lower portion of the column of solids, said vertical tube being heated by heat interchange with said solids.

16. An apparatus of the character described, comprising an elongated upright furnace, having an expanded intermediate portion, means for introducing solids at the top of said furnace and for withdrawing solids from the bottom of said furnace, means for controlling the rate of supply and withdrawal of said solids so that a continuous downwardly moving column is maintained which is relatively loosely packed at the intermediate zone, means for supplying a heating gas to the solids at said intermediate zone and withdrawing the same from the upper portion of said column, whereby the heat is supplied to the downwardly moving solids, means for suppling a fluid stream including a reactant gas to the lower portion of said column whereby the hydrocarbon vapor is subjected to thermal decomposition, and means for withdrawing the fluid stream from said column below the point of admission of the heating gases, and for discharging said fluid stream separately from the heating gases, said withdrawing means including a vertical tube extending through the upper zone of the downwardly moving solids, through which tube the reaction products are passed after being withdrawn from the lower portion of the column of solids, and a central tube within said vertical tube through which said fluid stream is initially passed prior to entering the lower portion of the column.

17. The process of promoting vapor phase thermal chemical reactants in a flowing stream including a hydrocarbon while passing through an appreciable deep continuous column of solids confined in a reaction furnace at elevated temperatures, said process comprising passing said column of solids downwardly into and through a reaction zone, introducing hot gases into an intermediate expanded zone, maintaining the solids in the expanded portion of said column in a loose and free-tumbling condition, passing the said hot gases through said expanded portion upwardly through the said column and out at the upper portion of the column, simultaneously introducing a hydrocarbon fluid in the vapor phase into the lower portion of said moving column, passing said hydrocarbon vapor upwardly through the lower portion of said column wherein it is thermally decomposed, and separately withdrawing the reaction products from said column at a point below the point of introduction of said first named hot gases.

18. A process which comprises passing a continuous column of solids downwardly in a reaction zone, heating said column by introducing thereinto at an expanded intermediate zone hot combustion gases, passing the hot gases upwardly through the column and out of the top of said column of solids, simultaneously introducing a preheated hydrocarbon vapor near the bottom of the moving column, passing said hydrocarbon vapor upwardly through said column wherein it is thermally decomposed and withdrawing the reaction products from the said column at a point below the point of introduction of the first named hot gas, and continuously maintaining a controlled gas pressure throughout the downwardly moving column of solids.

WILLIAM W. ODELL.